United States Patent
Yukishima et al.

(10) Patent No.: US 11,679,663 B2
(45) Date of Patent: Jun. 20, 2023

(54) IN-WHEEL MOTOR DRIVE DEVICE

(71) Applicant: NTN CORPORATION, Osaka (JP)

(72) Inventors: Ryou Yukishima, Shizuoka (JP);
Katsunori Sato, Shizuoka (JP)

(73) Assignee: NTN CORPORATION, Osaka (JP)

(*) Notice: Subject to any disclaimer, the term of this patent is extended or adjusted under 35 U.S.C. 154(b) by 192 days.

(21) Appl. No.: 17/268,332

(22) PCT Filed: Sep. 9, 2019

(86) PCT No.: PCT/JP2019/035329
§ 371 (c)(1),
(2) Date: Feb. 12, 2021

(87) PCT Pub. No.: WO2020/054650
PCT Pub. Date: Mar. 19, 2020

(65) Prior Publication Data
US 2021/0316605 A1    Oct. 14, 2021

(30) Foreign Application Priority Data
Sep. 10, 2018  (JP) .............................. JP2018-168800

(51) Int. Cl.
*B60K 7/00*     (2006.01)
*B60K 17/04*    (2006.01)

(52) U.S. Cl.
CPC .......... *B60K 7/0007* (2013.01); *B60K 17/043* (2013.01)

(58) Field of Classification Search
CPC ............................ B60K 7/0007; B60K 17/043
(Continued)

(56) References Cited

U.S. PATENT DOCUMENTS 5,087,229 A * 2/1992 Hewko ............... B60K 7/0007
                                                       475/149
8,002,060 B2 * 8/2011 Komatsu ............... H02K 7/083
                                                       180/65.6
(Continued)

FOREIGN PATENT DOCUMENTS

CN     108223699      6/2018
JP     2017-65671     4/2017
(Continued)

OTHER PUBLICATIONS

International Preliminary Report on Patentability and Written Opinion of the International Searching Authority dated Mar. 9, 2021 in International (PCT) Application No. PCT/JP2019/035329.
(Continued)

*Primary Examiner* — Hau V Phan
(74) *Attorney, Agent, or Firm* — Wenderoth, Lind & Ponack, L.L.P.

(57) ABSTRACT

An input gear, an output gear, an input-side intermediate gear, and an output-side intermediate gear are helical gears. The output gear and the output-side intermediate gear have a larger module than the input gear and the input-side intermediate gear. The input gear and the input-side intermediate gear have a larger twisting angle than the output gear and the output-side intermediate gear. The output gear and the output-side intermediate gear have a larger effective tooth length than the input gear and the input-side intermediate gear.

2 Claims, 4 Drawing Sheets

(58) Field of Classification Search
USPC ....................................................... 180/65.51
See application file for complete search history.

(56) References Cited

U.S. PATENT DOCUMENTS

| | | | | |
|---|---|---|---|---|
| 8,261,866 | B2* | 9/2012 | Ishida | B60K 7/0007 |
| | | | | 180/65.6 |
| 8,596,395 | B2* | 12/2013 | Hirano | B60K 17/046 |
| | | | | 301/6.91 |
| 9,090,142 | B2* | 7/2015 | Lee | B60K 17/043 |
| 9,126,476 | B2* | 9/2015 | Takahashi | G01L 5/0009 |
| 9,283,851 | B2* | 3/2016 | Kanda | B60L 15/20 |
| 10,933,737 | B2* | 3/2021 | Tamura | H02K 7/116 |
| 2009/0100965 | A1* | 4/2009 | Sanji | B60K 6/387 |
| | | | | 180/65.6 |
| 2015/0158381 | A1* | 6/2015 | Shin | B60K 7/0007 |
| | | | | 475/149 |
| 2018/0272855 | A1* | 9/2018 | Tamura | B60B 35/14 |
| 2018/0294692 | A1 | 10/2018 | Sato | |
| 2019/0248224 | A1 | 8/2019 | Tamura et al. | |
| 2020/0384804 | A1 | 12/2020 | Takeuchi et al. | |

FOREIGN PATENT DOCUMENTS

| | | |
|---|---|---|
| JP | 2018-71686 | 5/2018 |
| JP | 2018-114834 | 7/2018 |

OTHER PUBLICATIONS

International Search Report dated Nov. 5, 2019 in International (PCT) Application No. PCT/JP2019/035329.
Extended European Search Report dated May 2, 2022 in corresponding European Patent Application No. 19858831.1.

* cited by examiner m1 > m2
t1 > t2

β1 > β2
f1 > f2 h1 > h2
w1 < w2

IN-WHEEL MOTOR DRIVE DEVICE

TECHNICAL FIELD

The present invention relates to an in-wheel motor drive device that is disposed in an inner space region of a wheel and drives the wheel.

BACKGROUND ART

As a drive device that drives a wheel, an in-wheel motor drive device provided inside a wheel is known.

In the in-wheel motor drive device, miniaturization and weight reduction are important issues because an increase in weight of the in-wheel motor drive device leads to an increase in an unsprung load of a vehicle, which deteriorates traveling stability and noise, vibration, and harshness (NVH) characteristics. Meanwhile, if a motor alone is to generate a torque necessary to drive the vehicle, a large and heavy motor is required. Therefore, in the in-wheel motor drive device, sufficient torque can be obtained even with a small motor by increasing the torque of the motor by using a reduction mechanism to achieve the miniaturization and weight reduction.

As the reduction mechanism used in such an in-wheel motor drive device, Patent Literature 1 discloses a three-axis parallel shaft gear reduction mechanism including an input shaft coaxially connected to a motor rotating shaft and having an input gear, an output shaft coaxially connected to an inner ring of a wheel hub bearing part and having an output gear, an intermediate shaft having a first intermediate gear that meshes with the input gear and a second intermediate gear that meshes with the output gear.

CITATIONS LIST

Patent Literature 1: JP 2018-114834 A

SUMMARY OF INVENTION

Technical Problem

In the reduction mechanism described in Patent Literature 1, helical gears are used as the gears configuring the reduction mechanism. Compared to spur gears, helical gears are excellent in that the number of teeth meshing at the same time is larger, tooth contact is dispersed, noise is quieter, and a torque fluctuation is smaller.

However, even in such a reduction mechanism using helical gears, a meshing transmission error (delay or advance of a relative rotation of a driven gear with respect to a driving gear) occurs between the gears that mesh with each other due to various factors such as a shape and elastic deformation of a tooth surface, a machining error of the gear shaft, and a gap and elastic deformation of the bearing that supports the gear shaft. As the meshing transmission error becomes large, the vibration and noise generated by this meshing transmission error also become large. Thus, not only riding comfort is deteriorated, but also components may be damaged or broken by the vibration.

Further, the meshing transmission error between gears can occur not only in the in-wheel motor drive device, but also in a so-called on-board type electric vehicle drive device provided with an electric motor on a vehicle body and a drive device such as a transmission provided in a gasoline engine vehicle. However, such a drive device is generally provided on the vehicle body via a vibration-proof member such as a rubber bush, and thus the vibration generated from the drive device is not easily transmitted to the vehicle body. On the other hand, the in-wheel motor drive device is attached to the wheels, and thus the vibration generated by the in-wheel motor drive device is easily transmitted to the vehicle body via a suspension or the like.

Based on the above, it is significantly important to reduce the vibration in order to improve the NVH characteristics, especially in the in-wheel motor drive device. Thus, measures to reduce the meshing transmission error between the gears are required.

An object of the present invention is to provide an in-wheel motor drive device capable of reducing a meshing transmission error between gears to achieve low vibration, and ensuring durability and miniaturization.

Solutions to Problem

In order to solve the above problems, the present invention is an in-wheel motor drive device including an electric motor part, a wheel bearing part, and a speed reducer part configured to decelerate a rotation of the electric motor part and transmit the rotation to the wheel bearing part, in which the speed reducer part is a parallel shaft gear reduction mechanism having three or more axes, the parallel shaft gear reduction mechanism including an input shaft integrally rotating with a rotating shaft of the electric motor part and having an input gear, an output shaft integrally rotating with a rotating shaft of the wheel bearing part and having an output gear, and an intermediate shaft having an input-side intermediate gear that meshes with the input gear and an output-side intermediate gear that meshes with the output gear, the input gear, the output gear, the input-side intermediate gear, and the output-side intermediate gear are helical gears, the output gear and the output-side intermediate gear have a larger module than the input gear and the input-side intermediate gear, the input gear and the input-side intermediate gear have a larger twisting angle than the output gear and the output-side intermediate gear, and the output gear and the output-side intermediate gear have a larger effective tooth length than the input gear and the input-side intermediate gear.

As a method of reducing a meshing transmission error between the helical gears, there are a method of making the gear module smaller, a method of increasing the twisting angle, and a method of increasing the effective tooth length.

First, the method of making the module smaller can reduce the meshing transmission error, but there is a concern that durability is decreased because teeth are made smaller. Here, a larger load acts on second-stage gears (output gear and output-side intermediate gear) whose rotation is decelerated than the load on first-stage gears (input gear and input-side intermediate gear), and thus strength of the second-stage gears needs to be increased. Thus, as in the present invention, the durability of the second-stage gears can be ensured by making the module of the second-stage gears larger than the module of the first-stage gears. Meanwhile, the meshing transmission error can be reduced by preferentially making the module of the first-stage gears smaller because a load acting on the first-stage gears is smaller than the load acting on the second-stage gears.

Next, the method of increasing the twisting angle can reduce the meshing transmission error, but increases an axial component of the load acting on a tooth surface. Thus, considering that especially a large load acts on the second-stage gears, it is not preferable in terms of the durability to make the twisting angle of the second-stage gears larger than the twisting angle of the first-stage gears. Thus, as in the present invention, by setting the twisting angle of the first-stage gears to be larger than the twisting angle of the second-stage gears, it is possible to prevent a large axial load from acting on the second-stage gears. Meanwhile, the meshing transmission error can be reduced by preferentially making the twisting angle of the first-stage gears larger because a load acting on the first-stage gears is smaller than the load acting on the second-stage gears.

Finally, the method of increasing the effective tooth length can reduce the meshing transmission error, but tends to make a tooth tip thinner, and thus there is a concern that the durability may be decreased. As described above, increasing the effective tooth length of the first-stage gears having a smaller module causes particularly the tooth tip to be thinner, and thus it is not desirable in terms of the durability to increase the effective tooth length of the first-stage gears. Therefore, as in the present invention, by preferentially making the effective tooth length of the second-stage gears to be larger than the effective tooth length of the first-stage gears, the meshing transmission error of the second-stage gears can be reduced while ensuring the durability of the first-stage gears.

In this way, in the present invention, by setting the module, the twisting angle, and the effective tooth length of each of the first-stage gears and the second-stage gears as described above, the meshing transmission error can be reduced while ensuring the durability. Further, adjustment of elements of the module, the twisting angle, and the effective tooth length do not affect an axial dimension of the gears, and thus the axial dimension is not increased by changing these elements. It is therefore possible to miniaturize the in-wheel motor drive device.

Further, the front meshing pressure angle of the second-stage gears is preferably set to be smaller than the front meshing pressure angle of the first-stage gears in order to alleviate the thinning of the tooth tip due to the increase in the effective tooth length. This can alleviate the thinning of the tooth tip of the second-stage gears and improve the durability of the gear. Further, by reducing the front meshing pressure angle, the meshing transmission error of the second-stage gears can be also reduced.

Advantageous Effects of Invention

The present invention can reduce the meshing transmission error between the gears and achieve low vibration while ensuring the durability and miniaturization.

DESCRIPTION OF EMBODIMENT

Hereinafter, the present invention will be described with reference to the accompanying drawings. In each of the drawings for explaining the present invention, components such as members and parts having the same function or shape are given the same reference signs as far as the components are distinguishable from each other, and the description thereof will be omitted after being described once.

Figure 6:
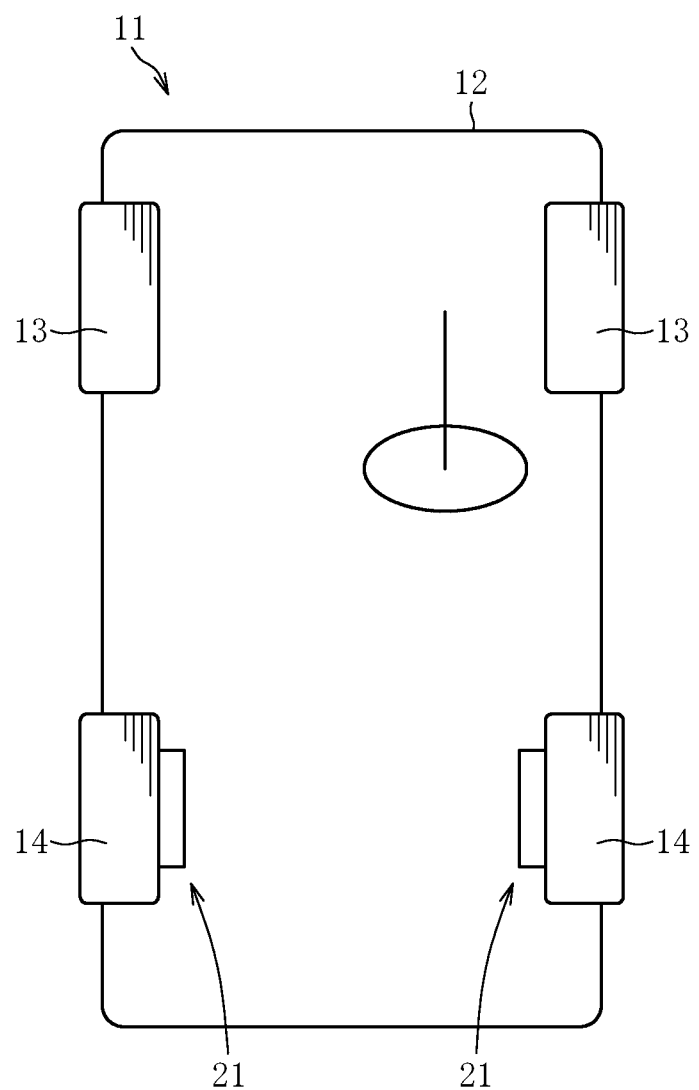
FIG. 6 is a plan view showing a schematic configuration of an electric vehicle provided with the in-wheel motor drive device.
Figure 7:
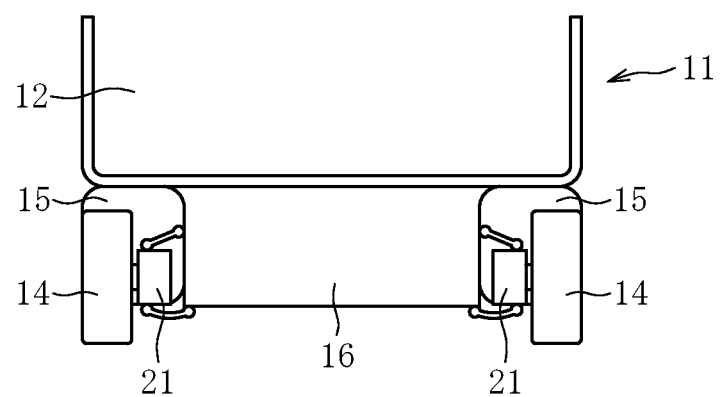
FIG. 7 is a rear sectional view showing the electric vehicle in FIG. 6.

FIG. 6 is a schematic plan view of an electric vehicle 11 provided with an in-wheel motor drive device 21, and FIG. 7 is a schematic sectional view of the electric vehicle 11 as viewed from rearward.

As shown in FIG. 6, the electric vehicle 11 includes a chassis 12, front wheels 13 as steering wheels, rear wheels 14 as driving wheels, and the in-wheel motor drive devices 21 that transmit a driving force to the rear wheels 14. As shown in FIG. 7, the rear wheels 14 are housed inside wheel housings 15 of the chassis 12 and are fixed to below the chassis 12 via a suspension device (suspension) 16.

The suspension device 16 supports each rear wheel 14 by a suspension arm extending laterally, and suppresses a vibration of the chassis 12 by absorbing the vibration received by each rear wheel 14 from the ground by a strut including a coil spring and a shock absorber. A stabilizer that suppresses inclination of a vehicle body during turning is provided at a connecting part of the left and right suspension arms. The suspension device 16 is an independent suspension type in which the left and right wheels are independently raised and lowered in order to improve followability to unevenness of a road surface and efficiently transmit the driving force of the rear wheels 14 to the road surface.

In the electric vehicle 11, the in-wheel motor drive devices 21 that drive the left and right rear wheels 14 are provided inside the wheel housings 15, thereby eliminating the need for providing a motor, a drive shaft, a differential gear mechanism, and the like on the chassis 12. Thus, there is an advantage that a large cabin space can be secured and the rotation of the left and right rear wheels 14 can be respectively controlled.

Before explaining a characteristic configuration of the present embodiment, an overall configuration of the in-wheel motor drive device 21 will be described with reference to FIGS. 1 and 2. In the following description, with the in-wheel motor drive device 21 mounted on a vehicle, a side close to outside the vehicle in a vehicle width direction (left in FIG. 1) is referred to as an outboard side, and a side close to a center of the vehicle in the vehicle width direction (right in FIG. 1) is referred to as an inboard side.

Figure 1:
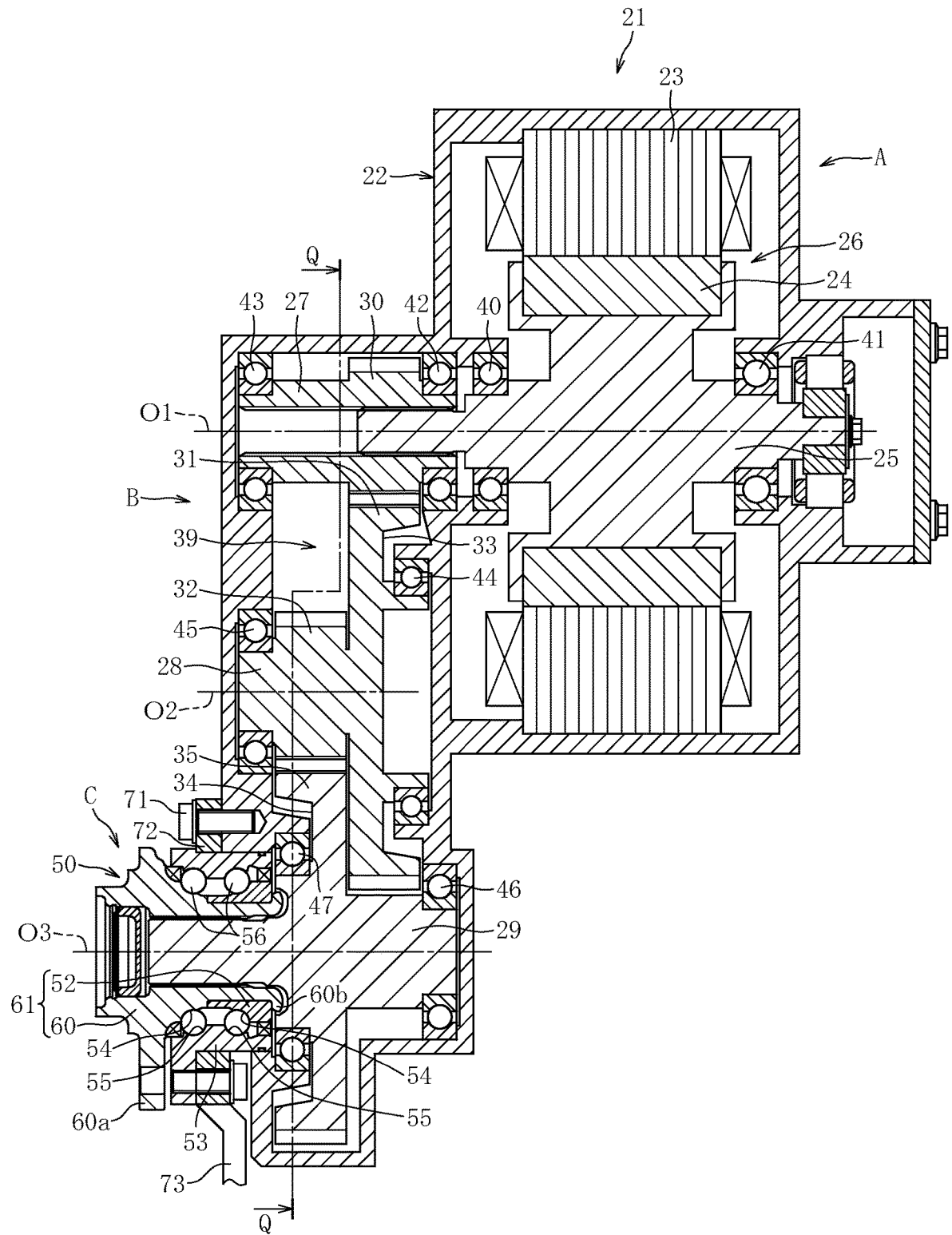
FIG. 1 is a vertical sectional view of an in-wheel motor drive device taken along line P-P of FIG. 2.
Figure 2:
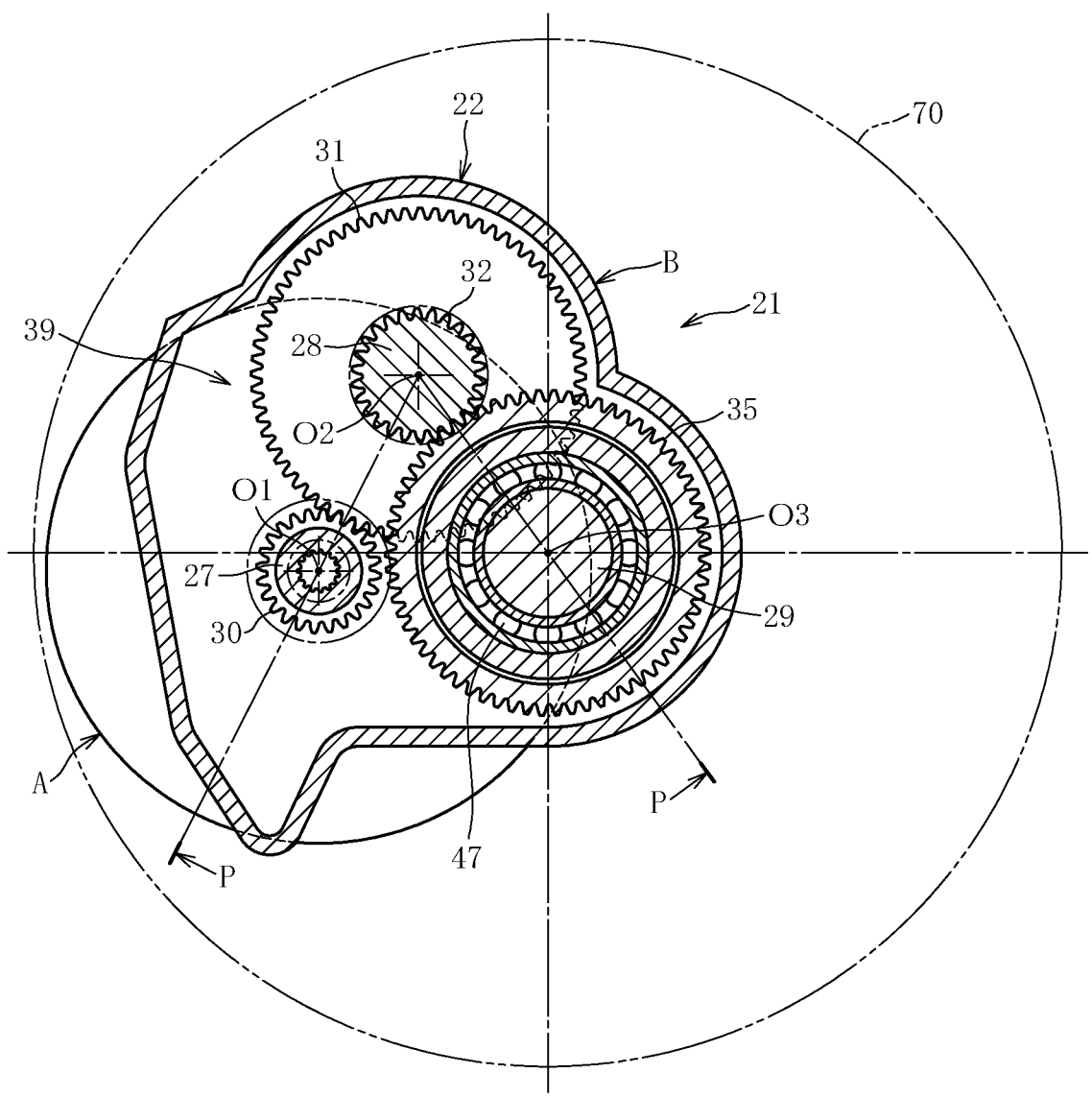
FIG. 2 is a cross-sectional view of the in-wheel motor drive device taken along line Q-Q in FIG. 1.

FIG. 1 is a vertical sectional view of the in-wheel motor drive device taken along line P-P in FIG. 2, and FIG. 2 is a cross-sectional view of the in-wheel motor drive device taken along line Q-Q in FIG. 1.

As shown in FIG. 1, the in-wheel motor drive device 21 includes an electric motor part A that generates a driving force, a speed reducer part B that decelerates and outputs a rotation of the electric motor part A, and a wheel bearing part C that transmits output from the speed reducer part B to the rear wheel 14 as a driving wheel. The electric motor part A, the speed reducer part B, and the wheel bearing part C are housed in a casing 22. The casing 22 has an integral structure as shown in FIG. 1, or can have a divisible structure.

The electric motor part A is configured by a radial gap electric motor 26 including a stator 23 fixed to the casing 22, a rotor 24 disposed so as to face the stator 23 with a gap in a radial inner side of the stator 23, and a motor rotating shaft 25 disposed in the radial inner side of the rotor 24 and integrally rotating with the rotor 24. The motor rotating shaft 25 can rotate at high speed at about 10,000 and several thousand rotations per minute. The stator 23 is configured by winding a coil around a magnetic core, and the rotor 24 is configured by a permanent magnet or the like. The electric motor part A may be of axial gap type.

One end of the motor rotating shaft 25 in an axial direction (on the left in FIG. 1) is rotatably supported with respect to the casing 22 by a rolling bearing 40. The other end of the motor rotating shaft 25 in the axial direction (on the right in FIG. 1) is rotatably supported with respect to the casing 22 by a rolling bearing 41.

The speed reducer part B is configured by a three-axis, two-stage parallel shaft gear reduction mechanism 39 including an input shaft 27, an intermediate shaft 28, and an output shaft 29 disposed in parallel with each other. The input shaft 27 is provided with an input gear 30, and the output shaft 29 is provided with an output gear 35. Further, the intermediate shaft 28 is provided with an input-side intermediate gear 31 that meshes with the input gear 30 and an output-side intermediate gear 32 that meshes with the output gear 35.

The input shaft 27 is rotatably supported with respect to the casing 22 by two rolling bearings 42 and 43 provided on both sides of the input gear 30 in an axial direction. The intermediate shaft 28 is rotatably supported by two rolling bearings 44 and 45 with respect to the casing 22 in a state where the input-side intermediate gear 31 is disposed on the inboard side and the output-side intermediate gear 32 is disposed on the outboard side. Further, the output shaft 29 is rotatably supported with respect to the casing 22 by two rolling bearings 46 and 47 provided on both sides of the output gear 35 in an axial direction. As these rolling bearings 40 to 47, it is preferable to use bearings capable of receiving both radial load and thrust load, for example, deep groove ball bearings.

In the present embodiment, of the two rolling bearings 44 and 45 that support the intermediate shaft 28, the rolling bearing 44 on the inboard side (close to the input-side intermediate gear 31) has a larger inner diameter and a larger outer diameter than the rolling bearing 45 on the outboard side (close to the output-side intermediate gear 32). Further, the rolling bearing 44 having a larger diameter is disposed on an inner diameter-side recess 33 provided on the input-side intermediate gear 31.

Of the two rolling bearings 46 and 47 that support the output shaft 29, contrary to a relationship between the rolling bearings 44 and 45 that support the intermediate shaft 28, the rolling bearing 47 on the outboard side has a larger inner diameter and a larger outer diameter than the rolling bearing 46 on the inboard side. Further, the rolling bearing 47 having a larger diameter is disposed on an inner diameter-side recess 34 provided on the output gear 35.

The input shaft 27 is integrally rotatably connected to the motor rotating shaft 25 by spline fitting (including serration fitting). Meanwhile, the output shaft 29 is integrally rotatably connected to a hub wheel 60 configuring a rotating shaft of the wheel bearing part C by spline fitting (including serration fitting).

The wheel bearing part C is configured by a wheel bearing 50 of inner ring rotating type. The wheel bearing 50 is a double row angular ball bearing mainly configured by an inner member 61 including a hub wheel 60 and an inner ring 52, an outer ring 53, a plurality of balls 56, and a cage (not shown).

An inner raceway surface 54 is formed on an outer circumference of the hub wheel 60 and the inner ring 52, and a double row outer raceway surface 55 is formed on an inner circumference of the outer ring 53 corresponding to each inner raceway surface 54. A ball 56 is rotatably disposed between the inner raceway surface 54 and the outer raceway surface 55 facing each other.

A flange part 60a for attaching the wheel is formed on an outer circumference of the hub wheel 60 on the outboard side. Although not shown, a brake disc and the wheel are attached to the flange part 60a for attaching the wheel. Meanwhile, the inner ring 52 is fitted to a small diameter step of the hub wheel 60 on the inboard side, and a crimping part 60b of the hub wheel 60 is pressed against the inner ring 52. The crimping part 60b is formed by crimping an end of the hub wheel 60 on the inboard side after the inner ring 52 is fitted to the hub wheel 60. By forming the crimping part 60b, the inner ring 52 is positioned in the axial direction and the wheel bearing 50 is preloaded.

The outer ring 53 is fastened and fixed to the casing 22 with a bolt 71 via an attachment 72. Further, the outer ring 53 is also fastened and fixed to an attachment part 73 to the suspension device by a bolt.

When the motor rotating shaft 25 rotates, the input shaft 27 rotates integrally with the motor rotating shaft 25, this rotary motion is transmitted between the input gear 30 and the input-side intermediate gear 31 that mesh with each other, and the intermediate shaft 28 rotates. Then, a rotary motion of the intermediate shaft 28 is transmitted between the output-side intermediate gear 32 and the output gear 35 that mesh with each other, and the output shaft 29 rotates. At this time, this rotary motion is decelerated by being transmitted from the input gear 30 to the input-side intermediate gear 31 having a larger number of teeth than the input gear 30, and further decelerated by being transmitted from the output gear 32 to the output gear 35 having a larger number of teeth than the output-side intermediate gear 32.

As described above, in the present embodiment, the rotary motion of the motor rotating shaft 25 is decelerated in two stages, and an amplified torque can be transmitted to the rear wheels 14. Thus, a small electric motor with a low torque and high rotation can be used. For example, when a reduction ratio of the speed reducer part B is 11, the electric motor can be miniaturized by using an electric motor that rotates at a high speed of about 10,000 and several thousand rotations per minute. As a result, a compact in-wheel motor drive device can be achieved, and an electric vehicle having excellent traveling stability and NVH characteristics can be obtained by suppressing an unsprung weight.

In the present embodiment, the reduction ratio between the input gear 30 and the input-side intermediate gear 31 and the reduction ratio between the output-side intermediate gear 32 and the output gear 35 are both set to 2.5 or more and 7 or less. Each reduction ratio between these gears is set to a value close to each other. For example, the ratio between reduction ratios is preferably 0.5 or more and 2 or less, preferably 0.8 or more and 1.2 or less.

Further, in the present embodiment, as shown in FIG. 2, when viewed from the axial direction, axis centers O1, O2, and O3 of the input shaft 27, the intermediate shaft 28, and the output shaft 29 are disposed to form apexes of a triangle. In this way, the axis centers O1, O2, and O3 of each of the shafts 27, 28, and 29 are disposed in a triangular shape, thereby miniaturizing an outer peripheral contour of the in-wheel motor drive device 21. As a result, the in-wheel motor drive device 21 can be installed inside a rear wheel 70 of an existing internal combustion engine (see FIG. 2).

Further, in the present embodiment, a helical gear (external wheel) is used for the input gear 30, the input-side intermediate gear 31, the output-side intermediate gear 32, and the output gear 35. Compared to spur gears, helical gears are effective in that the number of teeth meshing at the same time is larger, tooth contact is dispersed, noise is quieter, and a torque fluctuation is smaller.

However, even if helical gears are used, a meshing transmission error occurs due to various factors such as a shape and elastic deformation of a tooth surface, a machining error of the gear shaft, and a gap and elastic deformation of the bearing that supports the gear shaft. Reducing the meshing transmission error, which causes vibration, is an important issue particularly in the in-wheel motor drive device in which vibration is more easily transmitted to the vehicle body than in other vehicle drive devices.

As a method of reducing the meshing transmission error, there is a method of increasing a meshing ratio of the gears. When the meshing ratio is increased, a gear load due to the torque is dispersed, and the torque fluctuation in the meshing of the gears is reduced, and thus the meshing transmission error can be reduced.

Here, the meshing ratio of the helical gears is represented by a total meshing ratio ($\varepsilon$), which is a sum of a front meshing ratio ($\varepsilon a$) and an overlapping meshing ratio ($\varepsilon b$), as shown in the following equation (1).

[Equation 1]

$$\varepsilon = \varepsilon_a + \varepsilon_b \qquad (1)$$

The front meshing ratio ($\varepsilon a$) is a value obtained by dividing a meshing length on a line of action on a front surface of the gear by a normal pitch, and is represented by the following equation (2). In equation (2), da1 is a small diameter gear tooth tip diameter, da2 is a large diameter gear tooth tip diameter, db1 is a small diameter gear base diameter, db2 is a large diameter gear base diameter, a is a distance between centers, $\alpha t$ is a front pressure angle, $\alpha 't$ is a front meshing pressure angle, and mt is a front module.

[Equation 2]

$$\varepsilon_a = \frac{\sqrt{\left(\frac{d_{a1}}{2}\right)^2 - \left(\frac{d_{b1}}{2}\right)^2} + \sqrt{\left(\frac{d_{a2}}{2}\right)^2 - \left(\frac{d_{b2}}{2}\right)^2} - a\sin\alpha'_t}{\pi m_t \cos\alpha_t} \qquad (2)$$

Meanwhile, the overlapping meshing ratio ($\varepsilon b$) is a value obtained by dividing a tooth width by a pitch in a tooth width direction, and is represented by the following equation (3). In equation (3), b is the tooth width, $\beta$ is the twisting angle, and mt is the front module.

[Equation 3]

$$\varepsilon_b = \frac{b \tan\beta}{\pi m_t} \qquad (3)$$

In order to increase the total meshing ratio ($\varepsilon$), it is necessary to increase at least one of the front meshing ratio ($\varepsilon a$) or the overlapping meshing ratio ($\varepsilon b$).

Examples of a method of increasing the front meshing ratio ($\varepsilon a$) include the following methods (a) to (c).

(a) Make a gear module smaller. (Increase the number of teeth.)

(b) Reduce the front meshing pressure angle.

(c) Increase the effective tooth length that effectively acts on meshing. (Increase a tooth tip diameter.)

Meanwhile, examples of a method of increasing the overlapping meshing ratio ($\varepsilon b$) include the following methods (d) to (f).

(d) Make the gear module smaller. (Increase the number of teeth.)

(e) Increase an effective tooth width that effectively acts on meshing.

(f) Increase the twisting angle.

By adopting the methods listed in (a) to (f), it is possible to increase the front meshing ratio ($\varepsilon a$) and the overlapping meshing ratio ($\varepsilon b$) and reduce the meshing transmission error. However, elements shown in (a) to (f) affect not only the meshing ratio of the gear but also a size and strength of the gear, a load acting on the gear. It is therefore necessary to consider from the viewpoint of durability, miniaturization, and weight reduction of the in-wheel motor drive device.

Figure 3:
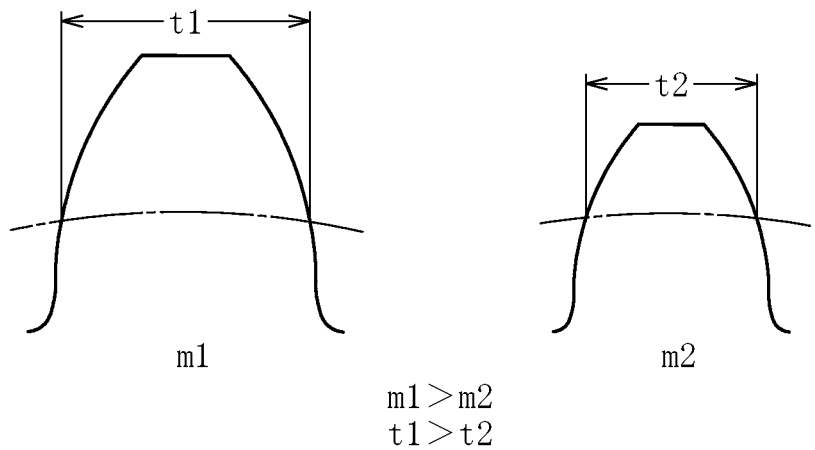
FIG. 3 is a diagram showing a comparison of gears having different modules.

First, the method of "making the gear module smaller" in (a) and (d) will be examined. The module, which is a value obtained by dividing the pitch diameter of the gear by the number of teeth, can be made smaller by increasing the number of teeth with the same pitch diameter. However, as a matter of course, as the module becomes smaller, the size of the single tooth also becomes smaller. As shown in FIG. 3, the teeth of the small module m2 have a smaller tooth thickness than the teeth of the large module m1 (t1>t2). Thus, making the module smaller will reduce the durability of the gear. It is therefore not possible to set a module value which is smaller than a value that satisfies the strength of the gear. In particular, in the three-axis, two-stage reduction mechanism as in the present embodiment, the rotation is decelerated and a large load acts on second-stage gears (output gear 35 and output-side intermediate gear 32) rather than on first-stage gears (input gear 30 and input-side intermediate gear 31). It is therefore necessary to obtain the gear strength of the second-stage gears rather than of the first-stage gears. Considering these circumstances, the second-stage gears preferably have a larger module than the first-stage gears in order to ensure the durability of the gears.

Further, in order to compensate for the decrease in durability due to the smaller module, it is conceivable to adopt the method of "increasing the effective tooth width" in (e). By increasing the effective tooth width, the load acting on the gear can be dispersed, and thus the durability can be improved. However, increasing the effective tooth width will increase an axial dimension of the gear. It is therefore difficult to adopt the method of "increasing the effective tooth width" in terms of miniaturization of the in-wheel motor drive device.

Figure 4:
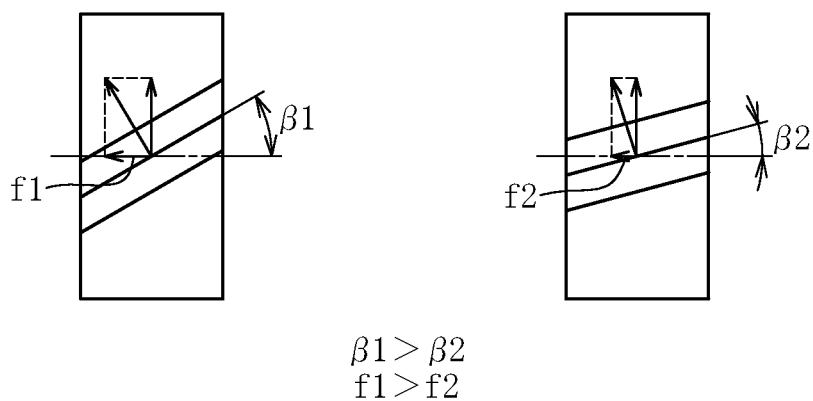
FIG. 4 is a diagram showing a comparison of gears having different twisting angles.

Next, the method of "increasing the twisting angle" in (f) will be examined. The increased twisting angle changes a direction of the load applied to the tooth surface of the helical gear, and thus changes a magnitude of an axial component of the load. That is, as shown in FIG. 4, as the twisting angle increases ($\beta 1 > \beta 2$), the axial component of the load applied to the tooth surface increases (f1>f2). In the present embodiment, the axial component of the load generated in each of the first-stage gears and the second-stage gears is received by the rolling bearings supporting the input shaft 27, the intermediate shaft 28, and the output shaft 29. Thus, as the twisting angle increases, the axial load received by the rolling bearings increases by the increase in the twisting angle. Further, as described above, in the present embodiment, a larger load acts on the second-stage gears than on the first-stage gears. Therefore, if the twisting angle of the second-stage gears is excessively large, there is a risk that a rolling element of the rolling bearing may excessively run on an end of a rolling surface, thereby causing early abrasion or breakage. Therefore, it can be said that the twisting angle of the first-stage gears to which a smaller load is applied is preferably increased rather than the twisting angle of the second-stage gears to which a larger load is applied.

Figure 5:
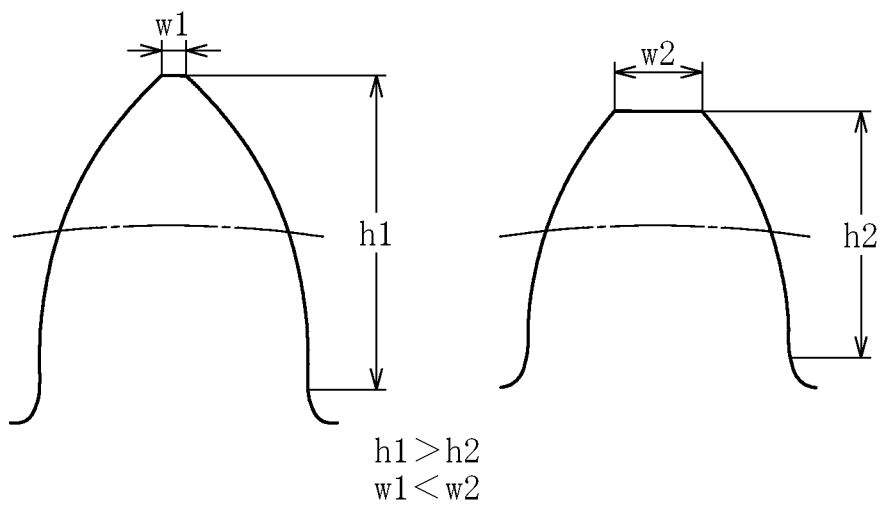
FIG. 5 is a diagram showing a comparison of gears having different effective tooth lengths.

Finally, the method of "reducing the front meshing pressure angle" in (b) and the method of "increasing the effective tooth length" in (c) will be examined. A gear having an effective tooth length set to 2.25 times as large as the module is a gear having a normal tooth length, generally called "normal teeth". In contrast, a gear having an effective tooth length set to a value larger than 2.25 times as large as the module is so-called "high teeth". By making the gears "high teeth" as described above, the tooth tip diameter is increased and the meshing length is increased, and thus the front meshing ratio ($\epsilon a$) can be increased. However, as shown in FIG. 5, when the effective tooth length is increased (h1>h2), a top width (top land) of the tooth tip becomes smaller (w1<w2), and thus the durability of the gears decreases and the tooth tip may be broken. Here, if the method of "reducing the front meshing pressure angle of the gear" in (b) is adopted as a measure against thinning of the tooth tip, the thinning of the tooth tip can be alleviated, and the durability of the gears can be improved while increasing the front meshing ratio ($\epsilon a$). However, even so, especially if the module is made smaller (when the teeth are made smaller), increasing the effective tooth length will further reduce the top width of the tooth tip, thereby increasing the risk of breakage. Therefore, as described above, if the second-stage gears preferably have a larger module than the first-stage gears, it can be said that the effective tooth length of the first-stage gears having a smaller module is preferably not increased.

Based on the above examination results, a relationship between the first-stage gears and the second-stage gears in the present embodiment is set as follows.

First, regarding the module, considering that the second-stage gears receives a larger load than the first-stage gears, the module of the second-stage gears is set to be larger than the module of the first-stage gears to ensure the durability of the second-stage gears. In other words, the first-stage gears receive a smaller load than the second-stage gears, and thus the module of the first-stage gears can be preferentially made smaller. Therefore, by making the module of the first-stage gears smaller than the module of the second-stage gears, the front meshing ratio ($\epsilon a$) and the overlapping meshing ratio ($\epsilon b$) can be preferentially increased.

Next, regarding the twisting angle, considering that the second-stage gears receive a larger load than the first-stage gears, the twisting angle of the first-stage gears is set to be larger than the twisting angle of the second-stage gears in order to suppress abrasion and breakage of the rolling bearings that support the second-stage gears. As a result, the overlapping meshing ratio ($\epsilon b$) can be preferentially increased for the first-stage gears while suppressing abrasion and breakage of the rolling bearings that support the second-stage gears.

Regarding the effective tooth length, the second-stage gears having a larger module are less likely to lose strength due to the thinner tooth tip than the first-stage gears having a smaller module. Thus, the effective tooth length of the second-stage gears is set to be larger than the effective tooth length of the first-stage gears. This can preferentially increase the front meshing ratio ($\epsilon a$) for the second-stage gears while suppressing a decrease in the strength of the first-stage gears.

In this way, in the present embodiment, the module, the twisting angle, and the effective tooth length of the first-stage gears and the second-stage gears are set as described above. This can effectively increase the front meshing ratio ($\epsilon a$) and the overlapping meshing ratio ($\epsilon b$), and reduce the meshing transmission error while ensuring the durability of the gears and the rolling bearings. This can suppress vibration caused by the meshing transmission error, and can provide the in-wheel motor drive device excellent in low vibration. Further, adjustment of elements of the module, the twisting angle, and the effective tooth length do not affect an axial dimension of the gears, and thus the axial dimension is not increased by changing these elements, and the in-wheel motor drive device can be miniaturized.

In addition, when there is a concern about the thinning of the tooth tip (decrease in durability) due to the increase in the effective tooth length, the thinning of the tooth tip can be alleviated by reducing the front meshing pressure angle. In particular, the tooth tip of the second-stage gears, having an increased effective tooth length, is considered to be thinner. In addition, because a larger load acts on the second-stage gears than the first-stage gear, there is a concern that the second-stage gears may be broken due to the thinning of the tooth tip. Thus, the front meshing pressure angle of the second-stage gears is preferably set to be smaller than the front meshing pressure angle of the first-stage gears in order to alleviate the thinning of the tooth tip and improve the durability. Further, by reducing the front meshing pressure angle, the front meshing ratio ($\epsilon a$) becomes larger in the second-stage gears, and the meshing transmission error can be reduced. When there is no particular concern about the durability of the second-stage gears, the front meshing pressure angles of the first-stage gears and the second-stage gears may be set to be the same.

Although the embodiment of the present invention has been described above, the present invention is not limited to the above embodiment, and can be further implemented in various forms without departing from the gist of the present invention.

In the above embodiment, the three-axis, two-stage reduction mechanism including three parallel shafts of the input shaft 27, the intermediate shaft 28, and the output shaft 29 has been described as an example. However, the present invention is also applicable to a reduction mechanism having two or more intermediate shafts 28 with four or more axes.

REFERENCE SIGNS LIST

21 In-wheel motor drive device
27 Input shaft
28 Intermediate shaft
29 Output shaft
30 Input gear
31 Input-side intermediate gear
32 Output-side intermediate gear
35 Output gear
39 Parallel shaft gear reduction mechanism
A Electric motor part
B Speed reducer part
C Wheel bearing part

The invention claimed is:
1. An in-wheel motor drive device comprising:
an electric motor part;

a wheel bearing part; and a speed reducer part configured to decelerate a rotation of the electric motor part and transmit the rotation to the wheel bearing part, wherein the speed reducer part is a parallel shaft gear reduction mechanism having three or more axes, the parallel shaft gear reduction mechanism including an input shaft integrally rotating with a rotating shaft of the electric motor part and having an input gear, an output shaft integrally rotating with a rotating shaft of the wheel bearing part and having an output gear, and an intermediate shaft having an input-side intermediate gear that meshes with the input gear and an output-side intermediate gear that meshes with the output gear, the input gear, the output gear, the input-side intermediate gear, and the output-side intermediate gear are helical gears, the output gear and the output-side intermediate gear have a larger module than the input gear and the input-side intermediate gear, the input gear and the input-side intermediate gear have a larger twisting angle than the output gear and the output-side intermediate gear, and the output gear and the output-side intermediate gear have a larger effective tooth length than the input gear and the input-side intermediate gear.

2. The in-wheel motor drive device according to claim 1, wherein the input gear and the input-side intermediate gear have a smaller front meshing pressure angle than the output gear and the output-side intermediate gear.

* * * * *